United States Patent [19]
Apostoleris

[11] 3,887,826
[45] June 3, 1975

[54] METHOD AND MEANS FOR REDUCING AUDIBLE NOISE IN A DYNAMOELECTRIC MACHINE

[75] Inventor: Theodore G. Apostoleris, Ann Arbor, Mich.

[73] Assignee: Ford Motor Company, Dearborn, Mich.

[22] Filed: Oct. 1, 1973

[21] Appl. No.: 402,528

[52] U.S. Cl. ................ 310/43; 310/51; 310/154
[51] Int. Cl. .......................................... H02k 15/12
[58] Field of Search ....... 310/51, 40 MM, 154, 155, 310/49, 46, 42, 254, 43, 258, 45, 259, 91; 260/DIG. 42; 64/1 V; 264/272

[56] References Cited
UNITED STATES PATENTS

| | | | |
|---|---|---|---|
| 3,311,911 | 3/1967 | Pursiano | 310/49 |
| 3,368,275 | 2/1968 | Eberline | 310/154 |
| 3,396,294 | 8/1968 | Makino | 310/51 |
| 3,401,281 | 9/1968 | Martin | 310/42 |
| 3,482,125 | 12/1969 | Fleckenstein | 310/43 |
| 3,489,937 | 1/1970 | Maher | 310/154 |
| 3,521,096 | 7/1970 | Merriam | 310/154 |
| 3,539,853 | 10/1970 | Photiadis | 310/43 |
| 3,707,038 | 12/1972 | Hallerback | 310/43 |
| 3,824,416 | 7/1974 | Van de Griend | 310/51 |

*Primary Examiner*—R. Skudy
*Attorney, Agent, or Firm*—Robert A. Benziger; Keith L. Zerschling

[57] ABSTRACT

The audible noise produced by a permanent magnet dynamoelectric machine may be reduced by securing the tips of the flux path members to the housing structure. Such machines, having the stator field producing structure located externally of a plastic housing structure, are provided with suitable securing of the flux path member tips to the plastic housing surface by interposing a semi-rigid bonding material, such as epoxy resin, therebetween. Preferably a hot melt curable material is used.

1 Claim, 2 Drawing Figures

METHOD AND MEANS FOR REDUCING AUDIBLE NOISE IN A DYNAMOELECTRIC MACHINE

BACKGROUND OF THE INVENTION

1. Field of the Invention

The present invention is related to the field of permanent magnet DC motors and particularly that portion of the above noted field which is concerned with such motors having stator field producing structures mounted externally to a nonpermeable, for example plastic, housing. More particularly still the present invention is related to that portion of the above noted field which is concerned with reducing or eliminating the audible noise produced by such motors.

2. Description of the Prior Art

According to my copending commonly assigned patent application Ser. No. 306,777 filed on Nov. 15, 1972, now U.S. Pat. No. 3,766,418 titled "Permanent Magnet Dynamoelectric Machine Flux Path Assembly" the stator field producing structure of a permanent magnet DC motor may be assembled through the use of resilient clips about a plastic cup shaped housing. Such structures may also be assembled by the use of mounting screws and bolts such as is illustrated in copending commonly assigned patent application Ser. No. 223,636 filed on Feb. 4, 1972 in the name of Apostoleris and Macoit and titled "Permanent Magnet Dynamoelectric Machine." While such structures have achieved substantial commercial success both from a cost and an electrical mechanical performance criteria, I have observed that these dynamoelectric machines produce substantially more audible noise than has been produced by their predecessor machines. It is therefore an object of the present invention to provide a method and means for substantially reducing, or eliminating, the audible noise produced by such motors. While audible noise is less prominent in prior art DC permanent magnet dynamoelectric machines having stator field producing structures situated internally of the housing, it is also an object of the present invention to provide a method and means which may be applied to this latter class of dynamoelectric machines to substantially reduce or eliminate the audible noise which occurs in this class of machines.

In conducting investigations initially with permanent magnet DC dynamoelectric machines having stator field producing structures located internally to a housing it has been determined that objectionable audible noise may be significantly reduced by for example placing a band or strap around the housing in the vicinity of the stator field and applying compression to the housing through said strap. As a result of this, it has always been believed that the major contributing factor to the objectionable audible noise has been some form of resonance vibration within the housing itself. Use of the external band or strap has somewhat increased the material and labor cost of these machines but is considered to be preferable to the design and use of more massive or complex housing structures since the strap can be selectively located and provides a variable adjustment. To the extent that the strap technique increases cost and the variability of the adjustment thereof does not greatly enhance the noise reduction, it is an object of the present invention to provide a less expensive noise reduction means and method which does not rely on adjustability for its usefulness.

I have observed that in the operation of the class of permanent magnet DC dynamoelectric machines having externally located stator field producing structures and further having nonmetallic, for example plastic, housing structures, the objectionable audible noise is substantially greater. In attempting to eliminate this audible noise, the application of compression producing straps or bands around the flux path assembly was seen to produce little if any significant reduction in audible noise. Varying the amount of compression provided virtually no significant variation and the amount of audible noise produced by the motor. It is therefore a specific object of the present invention to provide a method and means for reducing or eliminating the objectionable audible noise produced by a dynamoelectric machine having an externally located stator field producing structure. The application of the compressive straps involved locating the straps at the approximate center, with respect to the axis, of the stator field producing structure. It thus appeared to me that the objectionable audible noise was produced by the housing as previously believed or by the edges of the flux path members.

I have determined that the objectionable audible noise is produced at or near the unrestricted, free edges of the flux path members and particularly where two such edges intersect as, for example, at the tips of the flux path members. Having made this discovery, it is therefore a specific objective of this invention to provide a method and means for silencing the tips of the flux path members of dynamoelectric machines. By "silencing" is meant the elimination of, or substantial reduction in, the amount of objectionable audible noise produced by the dynamoelectric machines. More particularly it is an object of the present invention to provide such a method and means which is of utility with all classes of permanent magnet dynamoelectric machines.

SUMMARY OF THE PRESENT INVENTION

The present invention achieves the above-stated objective by the application of a small amount of suitable bonding material to the tips of the flux path members or yokes such that the flux path member tips are bonded to the surface of the dynamoelectric machine housing. The bonding agent or material should be interposed between the flux path member and the housing surface to provide a resilient, at least slightly resilient, cushion therebetween while strongly opposing movement of the flux path member tip away from the housing surface. The material may be, for example a hot melt or epoxy material.

DETAILED DESCRIPTION OF THE PREFERRED EMBODIMENT

Figure 1:
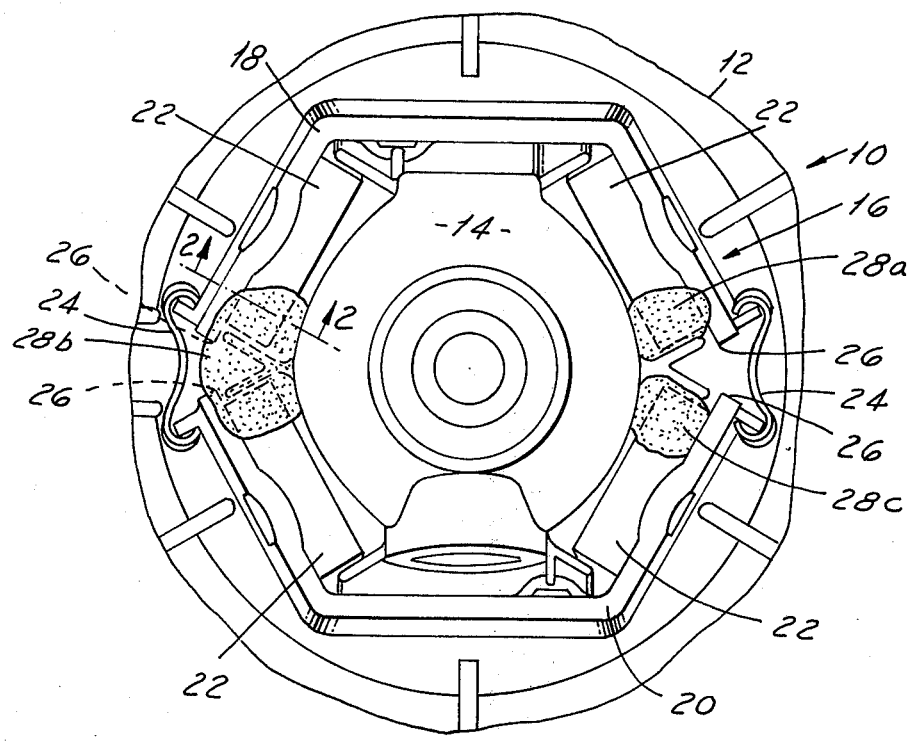
FIG. 1 illustrates a rear elevational view, partly broken away, of an exemplary dynamoelectric machine, having an externally mounted stator field producing structure, with which the present invention is of utility.

Referring now to FIG. 1, a partially broken away rear elevational view of a dynamoelectric machine 10 incorporating the present invention is shown. Dynamoelectric machine 10 has a housing structure 12 which includes a centrally located substantially cup shaped portion 14 which is arranged to rotatably receive the armature of the dynamoelectric machine. An externally located stator field producing structure 16 is illustrated in surrounding relationship to the cup shaped portion 14.

The stator field producing structure 16 is comprised of a pair of yokes or flux path members 18, 20 which are substantially identical in configuration and which are located externally to a plurality of permanent magnets 22. A pair of resilient clip members 24 are arranged to compress the flux path structure 16 about the cup shaped housing portion 14 such that the permanent magnets 22 are confined therebetween. The constructional details of this structure are more fully described in my above noted copending commonly assigned patent application Ser. No. 306,777, now U.S. Pat. No. 3,766,418.

Each of the flux path members 18, 20 is bounded by a generally radially extending edge such that a plurality of tips 26 are formed. The tips are in proximity to but axially displaced from the clip members 24. The structure as thus far described represents a "worst case" so to speak, in that the edges of the yokes or flux path members 18, 20 are generally free and unrestricted and can therefore oscillate slightly and thereby generate objectionable audible noise. With internally located stator field producing structures, the edges of the yokes are more restricted and confined. While clips 24 operate to bias the facing edges of the yokes 18, 20 together, the resilient nature of the clips permits oscillation sufficient to generate noise. My investigations have determined that the largest percentage of the audible noise produced by permanent magnet dynamoelectric machines is produced as a result of movement of the tips 26 of the flux path members radially with respect to the axis of rotation of the armature of the motor. In order to substantially reduce or eliminate the audible noise produced by such dynamoelectric machines it is necessary to substantially reduce or at least greatly restrict movement of the tips 26. To achieve this result, I have applied a bonding agent 28 to the dynamoelectric machine 10 in the vicinity of the tips 26 and have achieved significant noise reduction results. This bonding agent may comprise for example epoxy resin or hot melt amid material. The presently preferred bonding agent is a hot melt amid material available from Eastman Chemical Co. under their designation L 8080-148-AS. This material is a thermoplastic elastomer and hydrocarbon resin and is applied in a wet substantially fluid state and is allowed to dry through exposure to ambient conditions. It will be appreciated that a large number of suitable materials exists and that the selection of a material will depend on the specific conditions of the application. The material will preferable be semi-rigid after drying, setting or curing with some resiliency which will tend to damp any oscillation of the tips 26. The presently preferred material is a semi-rigid, semi-resilient, type bonding agent which is applied to the tips 26 to bond the steel of the yokes 18, 20, the permanent magnets 22 and the cup shaped portion 14 into a substantially unitary structure to reduce resonance caused by magnetic forces which are produced by rotation of the armature and which act on the tips 26.

Figure 2:
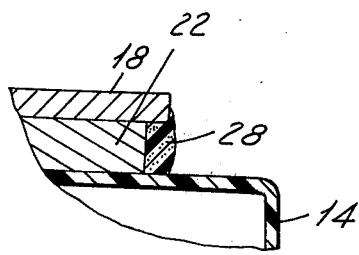
FIG. 2 illustrates a partially broken away, sectional view taken along section line 2—2 of FIG. 1 illustrating the application of the bonding material according to the present invention.

Referring now to FIG. 2, a partial sectional view taken along section line 2—2 of FIG. 1 is illustrated. As shown in this Figure, the bonding agent 28 is applied to fill the space which exists between the yoke or flux path member 18 and the cup shaped housing portion 14. Since the presently preferred permanent magnets are of the ceramic permanent magnet type and such permanent magnets are available in flat plate or block form and are usually polarized with the largest plane surfaces being the poles, the pole surfaces are usually relatively smooth while the other surfaces, the surfaces generally perpendicular to the pole surfaces, are relatively rough. The yokes 18, 20 may also be provided with relatively roughened edge surfaces. It will be appreciated that the bonding agent will flow into any roughened areas on the surfaces of the permanent magnets 22 and yokes 18, 20 and will cooperate with these surfaces and the cup shaped housing portion 14 to, 1) bond these portions into a substantially unitary structure, 2) further operate as a cushioning mechanism to prevent the tip 26 of yoke 18 from moving away from the cup shaped portion 14 of the housing and 3) operate as a buffer to prevent the tip 26 from approaching the cup shaped housing portion 14 thereby substantially restricting or eliminating any movement that could occur at a tip 26. The objectionable audible noise produced by such movement will therefore be eliminated or greatly reduced. In the case of plastic housing material, the bonding agent may coact with a previously prepared surface or may unite with the housing surface through thermal or chemical reaction to form a positive bond with the housing portion 14. This may be either a chemical linking or a surface roughening and mechanical linking. As illustrated in FIG. 1, the extent of the application of bonding agent 28 does not appear to greatly influence the degree of noise reduction obtained. Thus, the bonding agent 28 may overlie a yoke tip 26 as at 28a, or a pair of yoke tips 28b or may be interposed between a housing surface and the surface of a yoke or flux path member 20 as at 28c.

It can thus be seen that the instant invention readily accomplishes its stated objective. The application of the bonding agent as a semi-liquid material and its subsequent curing setting or hardening to a semi-rigid material, permits the application of the bonding agent by for example applying several drops to the finished motor assembly in the vicinity of the tips 26. When this bonding material cures or hardens it will be operative to grip the permanent magnets 20 and the tips 26 of the yokes 18 and 20 and will operate as a buffer material capable of also gripping the plastic housing 14 and preventing noise producing movement of tips 26 with respect to the housing portion 14.

I claim:

1. In combination with a permanent magnet dynamoelectric machine of the type having a stator flux producing structure comprising a plurality of permanent magnets and ferromagnetic flux path means engaging pairs of the permanent magnets, the flux path members having intersecting edge surfaces forming flux path member tips, each of the permanent magnets being located in proximity to at lease one flux path member tip, the stator flux producing structure being held in cooperative association with means forming a housing to electromagnetically coact with a rotary armature, the improvement comprising means forming a semi-rigid bonding agent interposed between the housing and the flux path member tips in contact with the associated permanent magnets to bond the flux path member to the housing.

* * * * *